United States Patent
Jung et al.

(10) Patent No.: US 9,429,358 B2
(45) Date of Patent: Aug. 30, 2016

(54) VACUUM HEAT INSULATING MATERIAL AND REFRIGERATOR INCLUDING THE SAME

(71) Applicant: SAMSUNG ELECTRONICS CO., LTD., Suwon-si, Gyeonggi-do (KR)

(72) Inventors: Young Sung Jung, Suwon-si (KR); Seung Hoon Kal, Anyang-si (KR); Seung Jin Oh, Seoul (KR); Choong Hyo Jang, Daejeon (KR); Sung Hun Hong, Hwaseong-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 79 days.

(21) Appl. No.: 14/288,573

(22) Filed: May 28, 2014

(65) Prior Publication Data

US 2015/0030800 A1    Jan. 29, 2015

(30) Foreign Application Priority Data

Jul. 26, 2013    (KR) .................. 10-2013-0088567

(51) Int. Cl.
*F16L 59/065*    (2006.01)
*F25D 23/06*    (2006.01)
(Continued)

(52) U.S. Cl.
CPC .............. *F25D 23/066* (2013.01); *B32B 1/00* (2013.01); *B32B 3/08* (2013.01); *B32B 3/18* (2013.01); *B32B 7/12* (2013.01); *B32B 15/04* (2013.01); *B32B 15/08* (2013.01); *B32B 15/085* (2013.01); *B32B 15/088* (2013.01); *B32B 15/09* (2013.01); *B32B 15/16* (2013.01); *B32B 19/045* (2013.01); *B32B 27/08* (2013.01); *B32B 27/283* (2013.01);
(Continued)

(58) Field of Classification Search
CPC .. Y10T 428/231; F16L 59/065; E04B 1/803; Y02B 80/12; F25D 2201/14
USPC ........................................................... 428/69
See application file for complete search history.

(56) References Cited

U.S. PATENT DOCUMENTS

| 2003/0134078 A1* | 7/2003 | Urata ................. B32B 1/04 428/69 |
| 2006/0263571 A1 | 11/2006 | Tsunetsugu et al. |
| 2011/0165367 A1 | 7/2011 | Kojima et al. |

FOREIGN PATENT DOCUMENTS

| JP | 2000-283643 | 10/2000 |
| KR | 2003-0072717 | 9/2003 |

(Continued)

OTHER PUBLICATIONS

Extended European Search Report dated Oct. 6, 2014 in corresponding European Patent Application No. 14171834.6.

*Primary Examiner* — Alexander Thomas
(74) *Attorney, Agent, or Firm* — Staas & Halsey LLP

(57) ABSTRACT

A vacuum heat insulating material having an improved structure to prevent the heat bridge phenomenon while improving the durability thereof, and a refrigerator having the same, the vacuum heat insulating material including a core material in a vacuum state, a sealing layer surrounding the core material, an inner layer covering the sealing layer, and having a first side and a second side connected to the first side, a protective layer located at an outside of the inner layer, a first blocking layer having at least one portion located between the first side of the inner layer and the protective layer, and a second blocking layer having at least one portion located between the second side of the inner layer and the protective layer.

22 Claims, 12 Drawing Sheets

(51) Int. Cl.
| | |
|---|---|
| *F25D 23/08* | (2006.01) |
| *B32B 7/12* | (2006.01) |
| *B32B 15/04* | (2006.01) |
| *B32B 15/08* | (2006.01) |
| *B32B 15/085* | (2006.01) |
| *B32B 15/088* | (2006.01) |
| *B32B 15/09* | (2006.01) |
| *B32B 15/16* | (2006.01) |
| *B32B 19/04* | (2006.01) |
| *B32B 27/08* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 1/00* | (2006.01) |
| *B32B 3/08* | (2006.01) |
| *B32B 3/18* | (2006.01) |

(52) U.S. Cl.
CPC ........... *B32B 27/304* (2013.01); *B32B 27/306* (2013.01); *B32B 27/32* (2013.01); *B32B 27/322* (2013.01); *B32B 27/34* (2013.01); *B32B 27/36* (2013.01); *F25D 23/08* (2013.01); *B32B 2307/304* (2013.01); *Y10T 428/231* (2015.01)

(56) References Cited

FOREIGN PATENT DOCUMENTS

| KR | 10-2009-0098501 | 9/2009 |
| KR | 10-0980744 | 9/2010 |
| WO | 2013/077602 A1 | 5/2013 |

* cited by examiner

VACUUM HEAT INSULATING MATERIAL AND REFRIGERATOR INCLUDING THE SAME

CROSS-REFERENCE TO RELATED APPLICATIONS

This application claims the benefit of Korean Patent Application No. 10-2013-0088567, filed on Jul. 26, 2013, in the Korean Intellectual Property Office, the disclosure of which is incorporated herein by reference.

BACKGROUND

1. Field

Embodiments of the present disclosure relate to a vacuum heat insulating material and a refrigerator including the same, and more particularly, to a vacuum heat insulating material having an improved structure to enhance the heat insulation efficiency.

2. Description of the Related Art

The energy consumed by human is limited, and global warming caused by carbon dioxide produced with the use of the energy is a problem which human confronts together with energy crisis. Accordingly, regulations of the energy consumption is getting tighten all over the world, and manufacturers of electric home appliances make efforts to comply with an energy consumption efficiency rating system of electric home appliances. The energy consumption efficiency rating system designed by the government to achieve the maximum efficiency with less energy suits for the demand of consumers who require high inner capacity and low power consumption. In particular, in the last several tens of years, many studies have been conducted on a refrigerator to reach the pinnacle in the studies associated with improving the efficiency of a cooling cycle, a compressor and a heat exchanger. Accordingly, in the recent years, studies have been mainly conducted on the heat loss, and various attempts have been made to enhance the energy efficiency by improving the heat insulating performance of the refrigerator.

The existing heat insulating material using polyurethane has a thermal conductivity of about 20 mW/(m*K), and the use of polyurethane heat insulating material makes the thickness of an outer wall of a refrigerator thicker, resulting in reduction of the storage capacity of the refrigerator. Accordingly, there is a need to use a vacuum heat insulating material having superior heat insulation efficiency.

The vacuum heat insulating material includes a core material and an envelope covering the core material. The envelope serves a great role to maintain the lifespan of the vacuum heat insulating material by blocking fine gas and vapor that infiltrate into the interior of a vacuum state. The envelope used for the vacuum heat insulating material is divided into an aluminum foil envelope and an aluminum deposition envelope. The aluminum foil envelope is obtained by attaching a PET film to an aluminum foil having a thickness of 5 μm or above and 12 μm or below. The aluminum deposition envelope is obtained by depositing aluminum on a PET film at a thickness of 15 μm or above and 100 nm or below, and then depositing the film having the aluminum deposited thereon in multi layers.

The thick aluminum layer of the aluminum foil envelope effectively blocks fine gas and vapor (moisture) of outside, and thus provides a superior durability. However, even if a central portion of the vacuum heat insulating material has a low thermal conductivity, a great amount of heat is exchanged through an edge portion. Such a phenomenon in which heat flows through an edge portion of the vacuum heat insulating material is referred to as the heat bridge.

Meanwhile, the aluminum deposition envelope has a thin aluminum layer and thus has a blocking efficiency of external fine gas and vapor (moisture) when compared to the aluminum foil envelope. In addition, as the aluminum deposition envelope is folded or bent in a process of manufacturing the aluminum deposition envelope, a fine pin hole is generated in the aluminum layer, and thus the durability of the aluminum envelope is lowered. However, the aluminum layer of the aluminum deposition envelope is thinner than that of the aluminum foil envelope, and thus the heat bridge does not occur.

As described above, there is a limitation to manufacture an effective vacuum heat insulating material since the aluminum foil envelope and the aluminum deposition envelope conflict with each in terms of the durability and the heat bridge.

SUMMARY

Therefore, it is an aspect of the present disclosure to provide a vacuum heat insulating material having an improved structure for preventing the heat bridge while improving the durability, and a refrigerator having the same.

Additional aspects will be set forth in part in the description which follows and, in part, will be obvious from the description, or may be learned by practice of the disclosure.

In accordance with one aspect, a vacuum heat insulating material includes a core material, a sealing layer, an inner layer, a protective layer, a first blocking layer and a second blocking layer. The core material may be in a vacuum state. The sealing layer may surround the core material. The inner layer may cover the sealing layer, and have a first side and a second side connected to the first side. The protective layer may be located at an outside of the inner layer. The first blocking layer may have at least one portion located between the first side of the inner layer and the protective layer. The second blocking layer may have at least one portion located between the second side of the inner layer and the protective layer.

An entire area of the first blocking layer may make contact with the first side of the inner layer, and an entire area of the second blocking layer may make contact with the second side of the inner layer.

At least one portion of the first blocking layer may make contact with the first side of the inner layer, and an entire area of the second blocking layer may make contact with the second side of the inner layer while connecting to the first blocking layer.

An entire area of the first blocking layer may make contact with the first side of the inner layer, and at least one portion of the second blocking layer may make contact with the second side of the inner layer while connecting to the first blocking layer.

At least one portion of the first blocking layer may make contact with the first side of the inner layer, and at least one portion of the second blocking layer may make contact with the second side of the inner layer while overlapping with the first blocking layer.

The first blocking material may include aluminum (Al) and stainless steel, and may have a thickness of about 5 μm or above to about 30 μm or below.

The second blocking material may include at least one of metal, inorganic matter and organic matter.

The metal may include at least one of aluminum and stainless steel.

The inorganic matter may include at least one of silicon dioxide ($SiO_2$), aluminum oxide ($Al_2O_3$), titanium dioxide ($TiO_2$), and polysilazane.

The organic matter may include at least one of silane and fluorine resin.

The second blocking layer may be formed in a method including at least one of physical deposition, chemical deposition and wet coating.

The second blocking layer may have a thickness of about 20 nm or above and about 30 μm or below.

The protective layer may include at least one of polyester (PET), oriented polypropylene (OPP), and nylon, oriented nylon.

The inner layer may include at least one of polyester (PET), vacuum materialized polyester (VM-PET), ethylene-vinyl alcohol (EVOH), and nylon.

The vacuum heat insulating material may include an extension part having a structure including the inner layer, the second blocking layer and the protective layer stacked up against one another from the sealing layer that protrudes in a direction getting distant from the core material.

In accordance with one aspect, a vacuum heat insulating material includes a first layer, a first blocking layer and a second blocking layer. The first layer may have a long side and a short side. The first blocking layer may be provided on the first layer and having durability. The second blocking layer may be provided at an edge of the first blocking layer along the long side to prevent a heat bridge phenomenon.

The vacuum heat insulating material may further include a second layer that covers the first blocking layer and the second blocking layer while facing the first layer so as to reduce shock.

The second blocking layer may be provided at both edges of the first blocking layer along the long side. The first blocking layer may be disposed in between the second blocking layer.

In accordance with one aspect, a refrigerator includes an outer case, an inner case, and a heat insulating layer. The inner case may be provided inside the outer case to accommodate a storage chamber. The heat insulating layer may be located between the outer case and the inner case. The heat insulating layer may include polyurethane foam and a vacuum heat insulating material. The vacuum heat insulting material may include a core material in a vacuum state, a sealing layer, an inner layer, a protective layer, a first blocking layer, and a second blocking layer. The sealing layer may surround the core material. The inner layer may cover the sealing layer, and have a first side and a second side connected to the first side. The protective layer may be located at an outside of the inner layer so as to reduce shock. The first blocking layer may have at least one portion located between the first side of the inner layer and the protective layer. The second blocking layer may have at least one portion located between the second side of the inner layer and the protective layer so as to reduce a heat bridge phenomenon.

The vacuum heat insulating may include an extension part having a structure including the sealing layer, the inner layer, the second blocking layer and the protective layer that are stacked up against another in a direction getting distant from the core material.

At least one of the first blocking layer and the second blocking layer may be bent.

The first blocking layer may be provided in parallel to the first side of the inner layer, and the second blocking layer may be provided at the second side while connecting to the first blocking layer.

The vacuum heat insulating material may be provided with the protective layer having a thickness of about 10 μm or above to about 30 μm or below, and the inner layer having a thickness of about 5 μm or above to about 30 μm or below.

The vacuum heat insulating material may be provided with the second blocking layer including a complex layer having an inorganic matter and an organic matter, the inorganic matter including at least one of silicon dioxide ($SiO_2$), aluminum oxide ($Al_2O_3$), titanium dioxide ($TiO_2$) and polysilazane, the organic matter including at least one of silane and fluorine resin.

As is apparent from the above description, the refrigerator is formed by using a vacuum heat insulating material capable of preventing the heat bridge while having a durability, so that the heat loss of the refrigerator is reduced.

In addition, the vacuum heat insulating material has a thin thickness while providing superior heat insulation efficiency compared to the existing heat insulating material, thereby increasing the storage capacity of the refrigerator.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
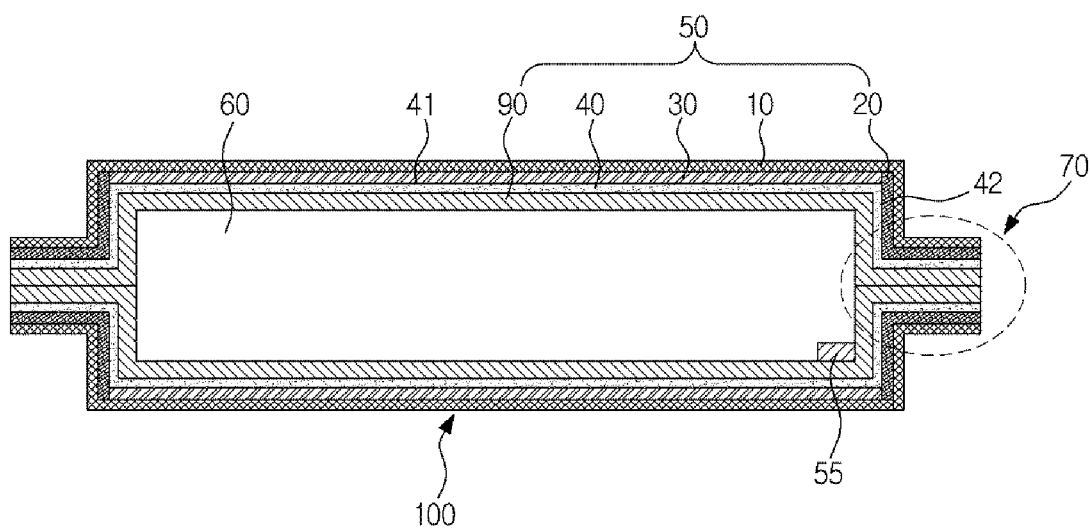
FIG. 1 is a cross sectional view illustrating configuration of a vacuum heat insulating material in accordance with an embodiment.

Reference will now be made in detail to the embodiments, examples of which are illustrated in the accompanying drawings, wherein like reference numerals refer to like elements throughout.

FIG. 1 is a cross sectional view illustrating a vacuum heat insulating material in accordance with an embodiment.

A vacuum heat insulating material 100 is one type of heat insulating material having an inner space thereof decompressed into a vacuum state such that low thermal conductivity of the vacuum state is used. Such a vacuum heat insulating material 100 is provided in the form of a panel having a predetermine thickness.

The vacuum heat insulating material 100 includes an envelope 50 forming a predetermined space inside thereof, and a core material 60 accommodated inside the envelope 50 to support such that the envelope 50 maintains a predetermined space.

The core material 60 is formed of glass fiber having a superior heat insulting efficiency. When the core material 60 is formed in a stack of panels each woven using glass fiber provided as fine as possible, an improved heat insulating efficiency is achieved. Meanwhile, as the core material 60, for example, silica may be used. Silica has a smaller change than glass fiber with a long period of use, and thus suitable for a long period of use. In addition, the core material 60 may be provided with a plurality of mesh members stacked up against one another. Here, the number of mesh members stacked may be adjusted depending on the thickness of the vacuum heat insulating material 100.

A getter 55 may be provided at an inside the envelope 50 to absorb gas component remaining inside the envelope 50 or introduced from the outside the envelope 50. The getter 55 may include calcium oxide (CaO) and zeolite as hygrosopic material. In addition, the getter 55 may include BaLi, CoO, BaO and CaO to absorb oxygen, hydrogen, nitrogen, carbon dioxide, and vapor. Here, the getter 55 is provided in the form of a block or a rectangular parallelpipe. In addition, the getter 55 may be coated on an inner surface of the envelope 50 or an outer surface of the core material 60.

The envelope 50 of the vacuum heat insulating material 100 includes a sealing layer 90, an inner layer 40, a first blocking layer 30, a second blocking layer 20 and a protective layer 10.

The sealing layer 90 represents an edge portion of the envelope 50 that is welded by heat after the core material 60 is accommodated in the envelope 50 such that the inside of the envelope 50 is closed.

In addition, the sealing layer 90 may include at least one of linear low density polyethylene (LLDPE), casting polypropylene (CPP) and high density polyethylene (HDPE), and has a thickness of about 10 μm or above to about 50 μm or below.

The inner layer 40 covers the sealing layer 90, and has a first side 41 and a second side 42 connected to the first side 41.

The inner layer 40 may include polyethylene terephthalate (PET), vacuum materialized polyester (VM-PET), ethylene-vinyl alcohol (EVOH), and nylon, and has a thickness of about 5 μm or above to about 30 μm or below.

In detail, as for ethylene-vinyl alcohol (EVOH), a hydroxyl group has a strong polarity, and thus intermolecular force is high and thus has low oxygen permeation. The ethylene-vinyl alcohol has hydrophile property, and thus sensitive to water. Polyethylene terephthalate (PET) has a relatively superior permeability while having superior moisture vapor permeability compared to ethylene-vinyl alcohol, and relatively cheap. Accordingly, by using polyethylene terephthalate (PET) and ethylene-vinyl alcohol (EVOH) together, moisture and air are more effectively blocked.

The first blocking layer 30 may be located between the first side 41 of the inner layer 40 and the protective layer 10. In addition, the first blocking layer 30 may be formed on the inner layer 40, for example, through a lamination process.

The first blocking layer 30 serves to prevent moisture and air from permeating into the envelope 50 while blocking heat transfer.

In addition, the first blocking layer 30 may include metal superior at blocking gas, for example, aluminum Al and stainless steel SUS, and may have a thickness of about 5 μm or above to about 30 μm or below.

The second blocking layer 20 may be located between the second side 42 of the inner layer 40 and the protective layer 10.

The second blocking layer 20 may include at least one of metal, inorganic matter and organic matter.

The metal may include at least one of aluminum and stainless steel.

The inorganic matter may include at least one of silicon dioxide ($SiO_2$), aluminum oxide ($Al_2O_3$), titanium dioxide ($TiO_2$), and polysilazane.

The organic matter may include at least one of silane and fluorine resin.

The second blocking layer 20 may be formed using at least one method of a physical deposition, for example, evaporating sputtering and aerosol deposition, a chemical deposition, for example, chemical vapor deposition and a wet coating.

The second blocking layer 20 may have a thickness of about 20 nm or above to about 30 μm or below.

The protective layer 10 may be located at an outside the inner layer 40.

The protective layer 10 may includes at least one of polyester (PET), oriented polypropylene (OPP), nylon, and oriented nylon.

In particular, nylon is material having a superior elasticity. The protective layer 10 according to the embodiment is formed using nylon so as to prevent the vacuum heat insulating material from being damaged from the external impact that may occur during assembly or installation of the vacuum heat insulating material. In addition, the protective layer 10 has a size suitable for enhancing the efficiency of the vacuum heat insulating material for the refrigerator such that the vacuum heat insulating material is prevented from being damaged due to external impact or scratch or due to process fault.

The protective layer 10 has a thickness of about 10 μm or above to about 30 μm or below.

Meanwhile, the core material 60 is inserted into the envelope 50, and in a state of vacuum formed, heat is applied to a portion of the sealing layer 90 to isolate the core material 60 from the outside, thereby forming an extension part 70 that extends in a direction of one side of the vacuum heat insulating material 100. When the vacuum heat insulating material 100 provided with the extension part 70 is used for the refrigerator, the extension part 70 may be referred to as a portion of the envelope 50 which is bent to make contact with each other. The extension part 70 has a structure including the inner layer 40, the second blocking layer 20 and the protective layer 10 stacked up against one another from the sealing layer 90 that protrudes in a direction getting distant from the core material 60.

The vacuum heat insulating material 100 may be formed by coupling a plurality of envelopes 50.

In addition, the vacuum heat insulating material 100 may be formed by coupling one envelope 50 to the first blocking layer 30 including metal having superior ability to block gas, for example, aluminum Al and stainless steel SUS.

FIGS. 2A to 2F are enlarged views illustrating a portion of an envelope of the vacuum heat insulating material in accordance with an embodiment.

The vacuum heat insulating material 100 may include the core material 60 in a vacuum state, the sealing layer 90 surrounding the core material 60, the inner layer 40 covering the sealing layer 90 and having the first side 41 and the second side 42 connected to the first side 41, the protective layer 10 located at an outside of the inner layer 40, the first blocking layer 30 having at least one portion located between the first side 41 of the inner layer 40 and the protective layer 10, and the second blocking layer 20 having at least one portion located between the second side 42 of the inner layer 40 and the protective layer 10.

Figure 2A:
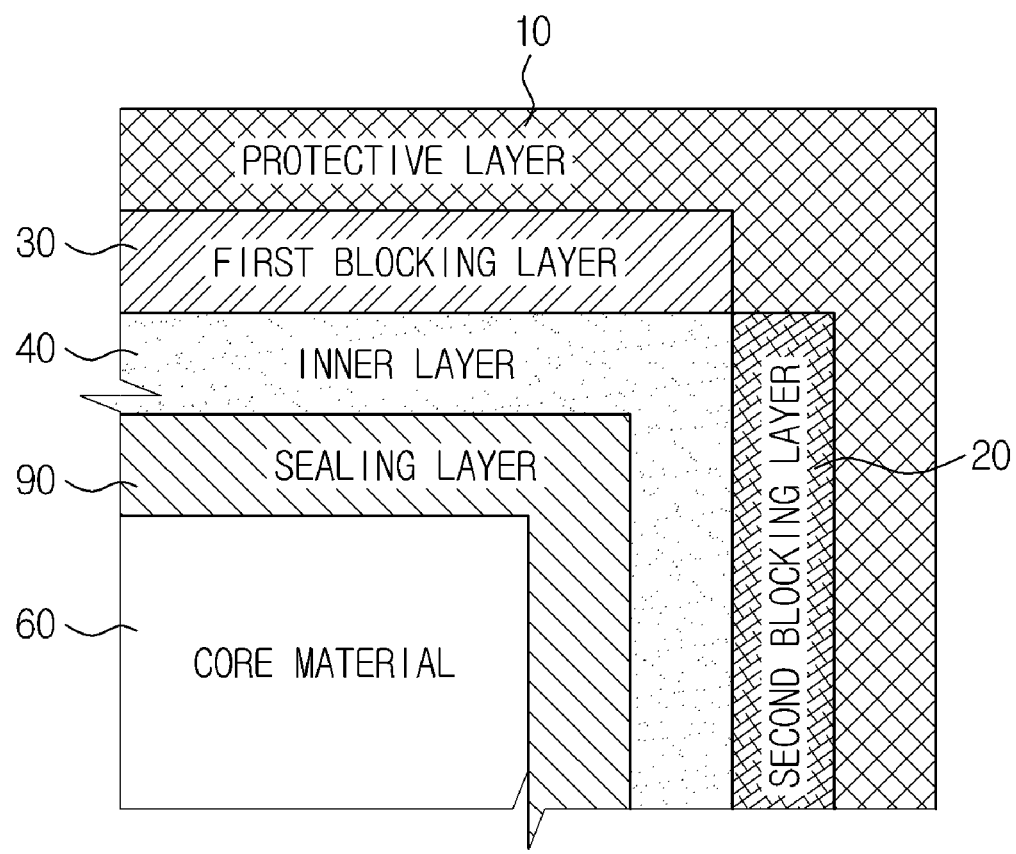
FIGS. 2A to 2F are enlarged views illustrating a portion of an envelope of the vacuum heat insulating material in accordance with an embodiment.

Referring to FIG. 2A, an entire area of the first blocking layer 30 may make contact with the first side 41 of the inner layer 40, and an entire area of the second blocking layer 20 may make contact with the second side 42 of the inner layer 40.

Figure 2B:
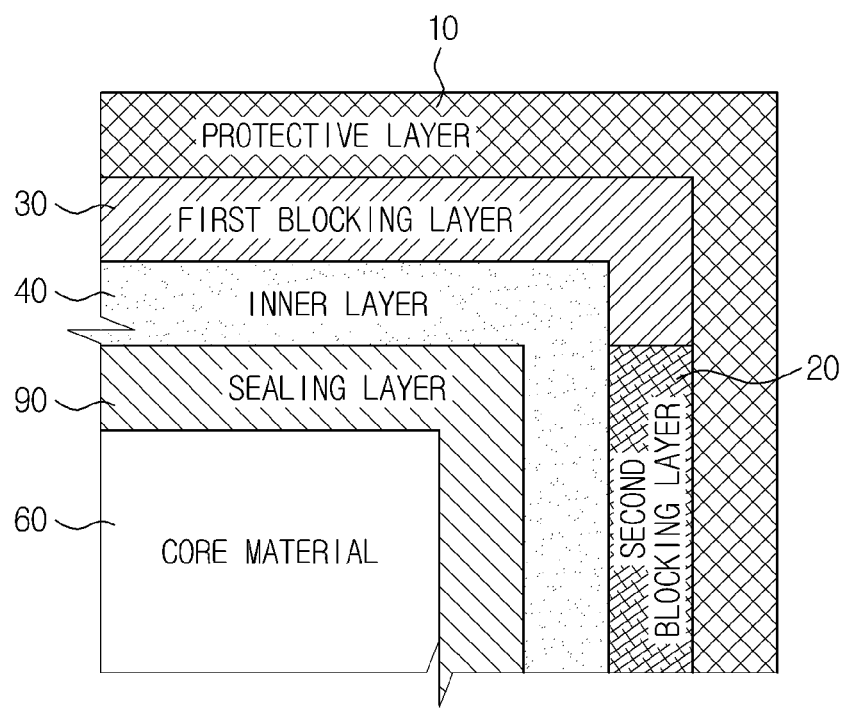

Referring to FIG. 2B, a portion of the first blocking layer 30 may make contact with the first side 41 of the inner layer 40, and an entire area of the second blocking layer 20 may make contact with the second side 42 of the inner layer 40 while connecting to the first blocking layer 30.

Figure 2C:
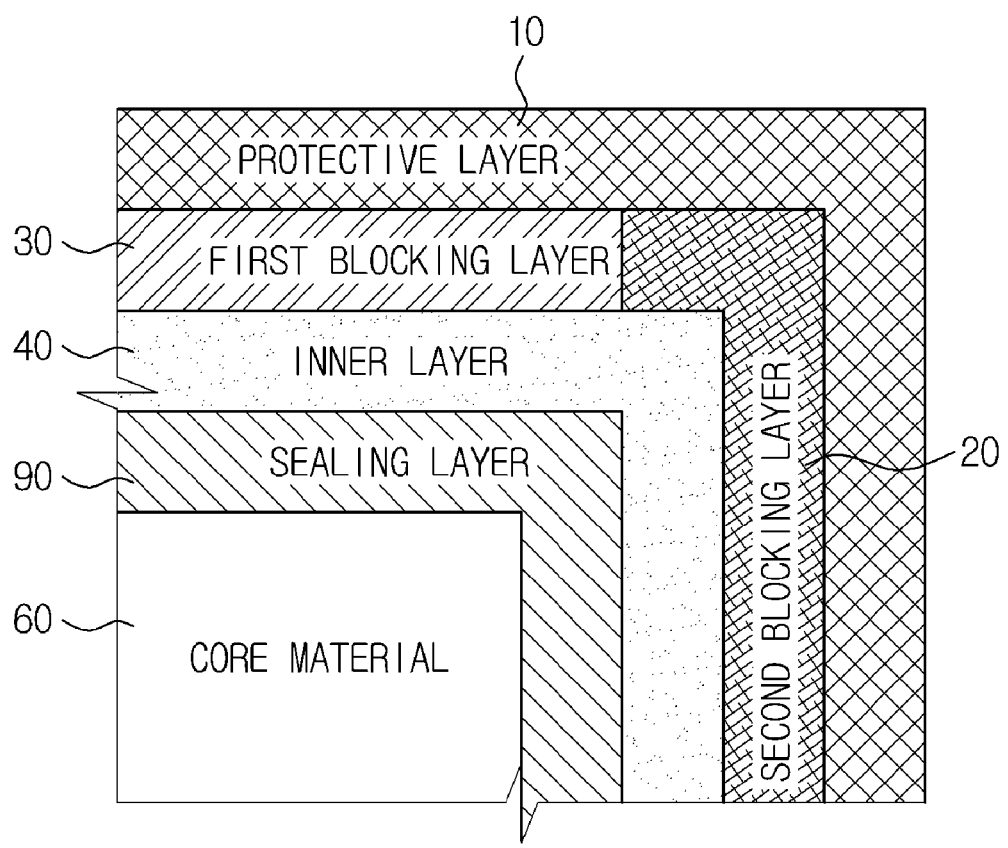

Referring to FIG. 2C, an entire area of the first blocking layer 30 may make contact with the first side 41 of the inner layer 40, and the second blocking layer 20 may make contact with the second side 42 of the inner layer 40 while connecting to the first blocking layer 30.

Figure 2D:
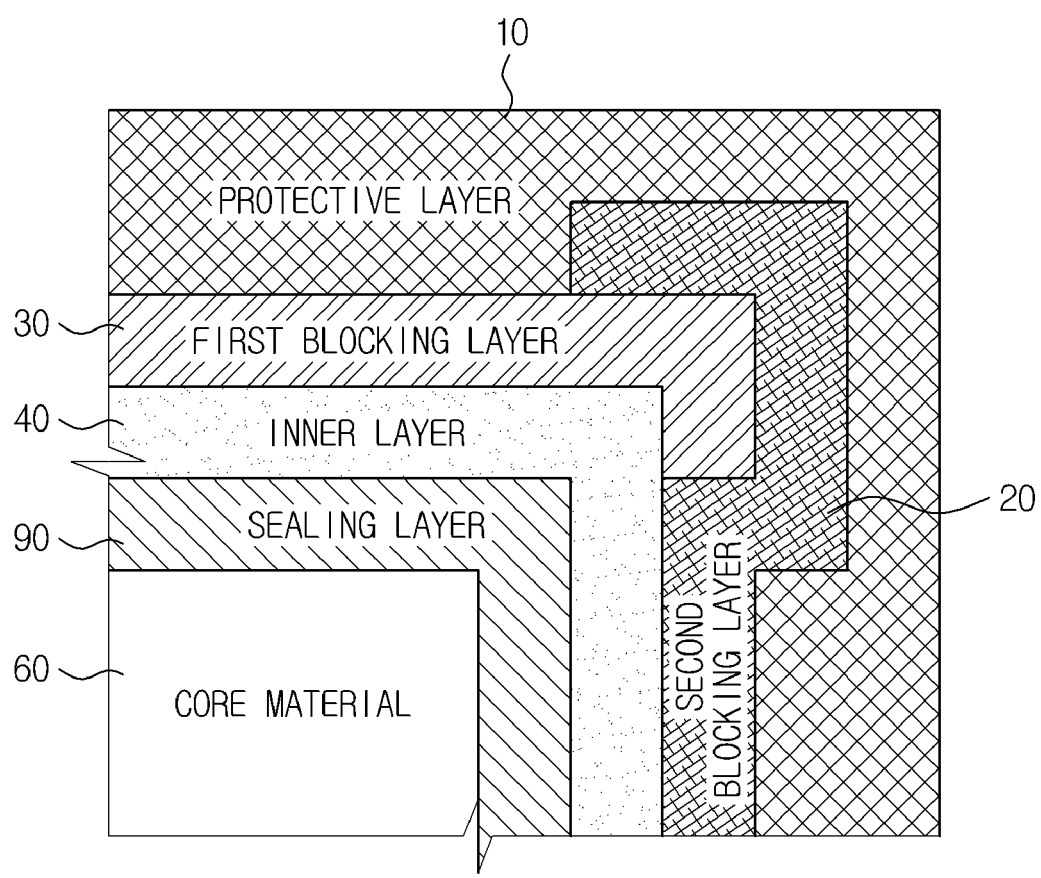

Referring to FIG. 2D, a portion of the first blocking layer 30 may make contact with the first side 41 of the inner layer 40, and a portion of the second blocking layer 20 may make contact with the second side 42 of the inner layer 40 while overlapping with the first blocking layer 30.

Figure 2E:
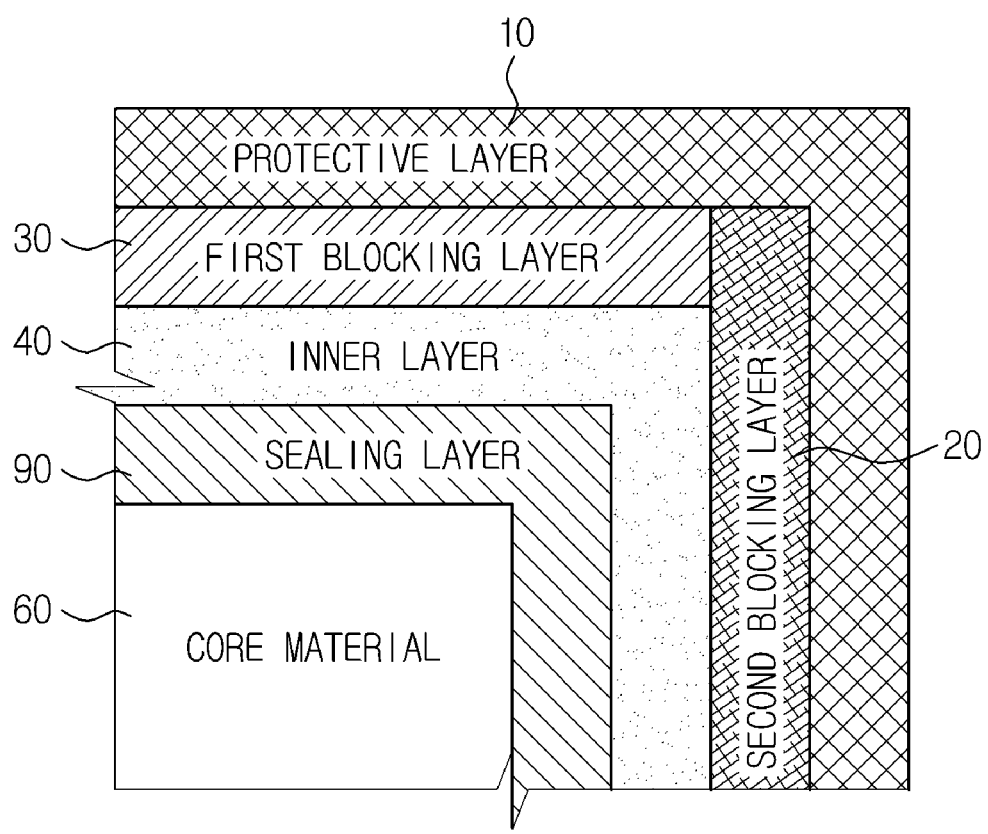

Referring to FIG. 2E, an entire area of the first blocking layer 30 may make contact with the first side 41 of the inner layer 40, and a portion of the second blocking layer 20 may make contact with the second side 42 of the inner layer 40 while connecting to the first blocking layer 30.

Figure 2F:
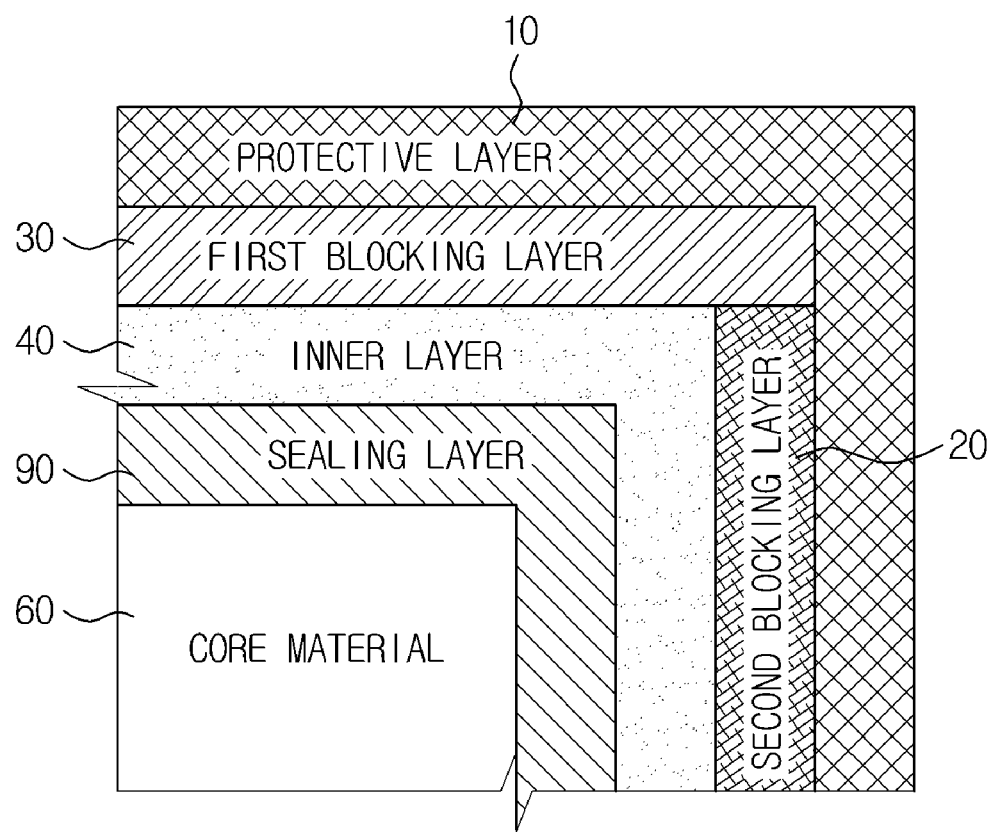

Referring to FIG. 2F, a portion of the first blocking layer 30 may make contact with the first side 41 of the inner layer 40, and an entire area of the second blocking layer 20 may make contact with the second side 42 of the inner layer 40 as a whole while connecting to the first blocking layer 30.

The arrangement of the first blocking layer 30 and the second blocking layer is not limited thereto.

Figure 3:
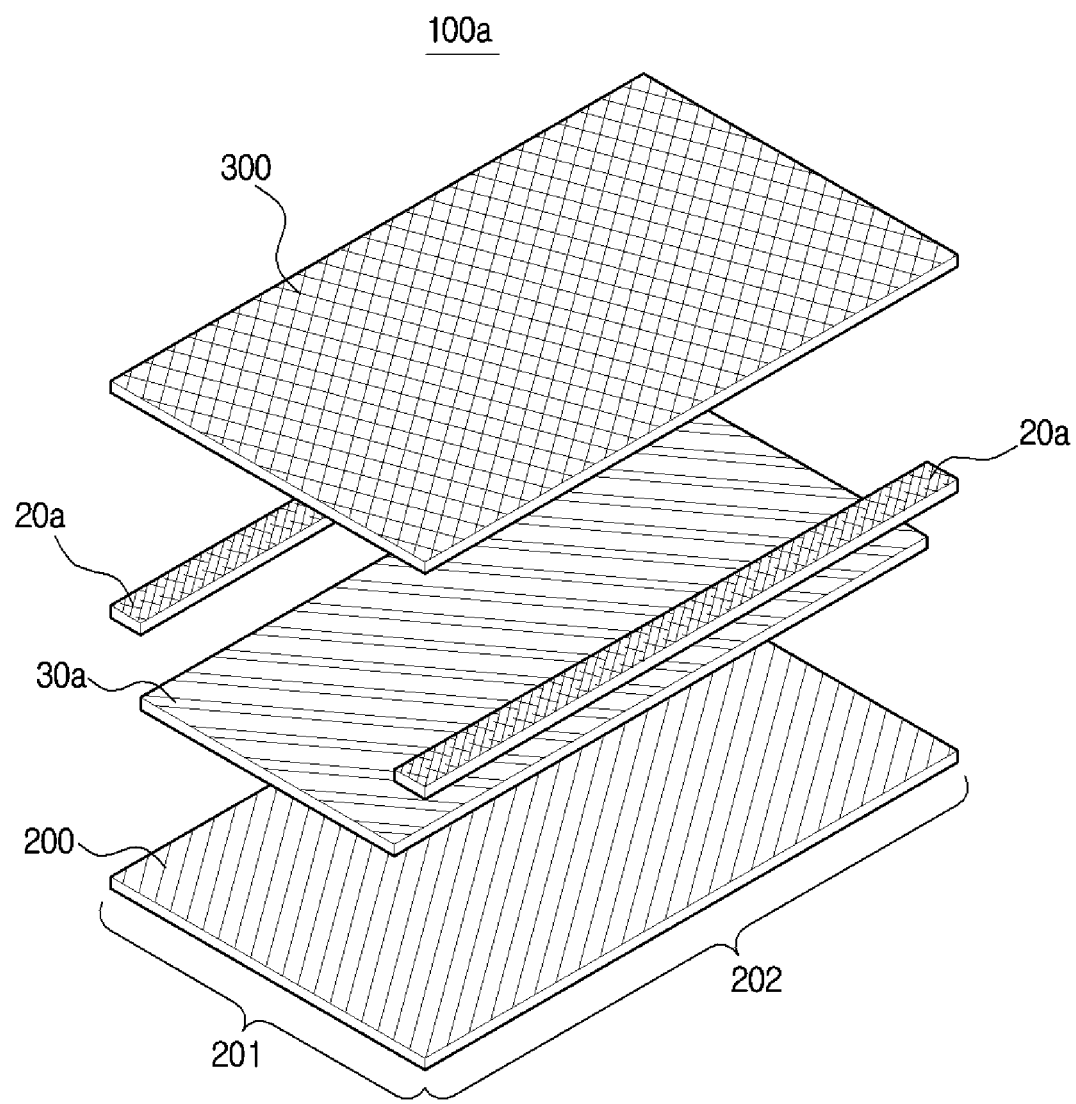
FIG. 3 is an exploded view illustrating a vacuum heat insulting material in accordance with an embodiment.

FIG. 3 is an exploded view illustrating a vacuum heat insulting material in accordance with an embodiment.

A vacuum heat insulating material 100a may include a first layer 200, a first blocking layer 30a, and a second blocking layer 20a.

The vacuum heat insulating material 100a includes the first layer 200 having a short side 201 and a long side 202, the first blocking layer 30a provided with air resistance and moisture resistance, and the second blocking layer 20a provided at an edge of the first blocking layer 30a along the long side 202 to prevent the heat bridge phenomenon.

The second blocking layer 20a does not only prevent the heat bridge phenomenon, but also has air resistance and moisture resistance as the first blocking layer 30a.

The vacuum heat insulating material 100a further includes a second layer 300 that covers the first blocking layer 30a and the second blocking layer 20a while facing the first layer 200 so as to reduce shock.

An entire area of the first blocking layer 30a may be located between the first layer 200 and the second layer 300 while making contact portions of the first layer 200 and a portion of the second layer 300. In this case, the second blocking layer 20a may be located at a portion that is not taken by the first blocking layer 30a between the first layer 200 and the second layer 300.

In addition, the second blocking layer 20a is provided at both edges of the first blocking layer 30a along the long sides 202, and the first blocking layer 30a is disposed in between the second blocking layer 20a.

In this case, the first blocking layer 30a and the second blocking layer 20a may make contact with each other.

The positions of the first blocking layer 30a and the second blocking layer 20a is not limited thereto.

Figure 4:
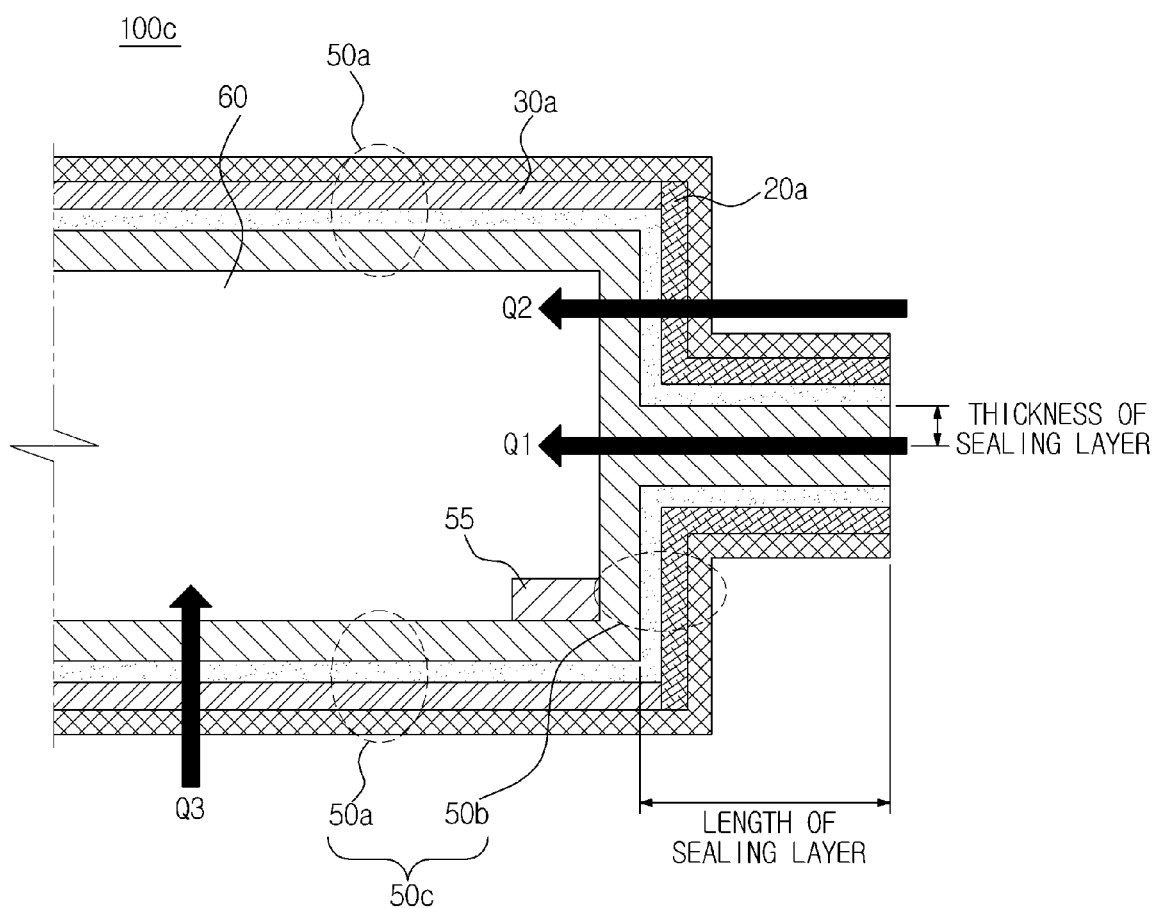
FIG. 4 is a drawing illustrating the amount of gas Q passing through the vacuum insulating material in accordance with an embodiment.
Figure 5:
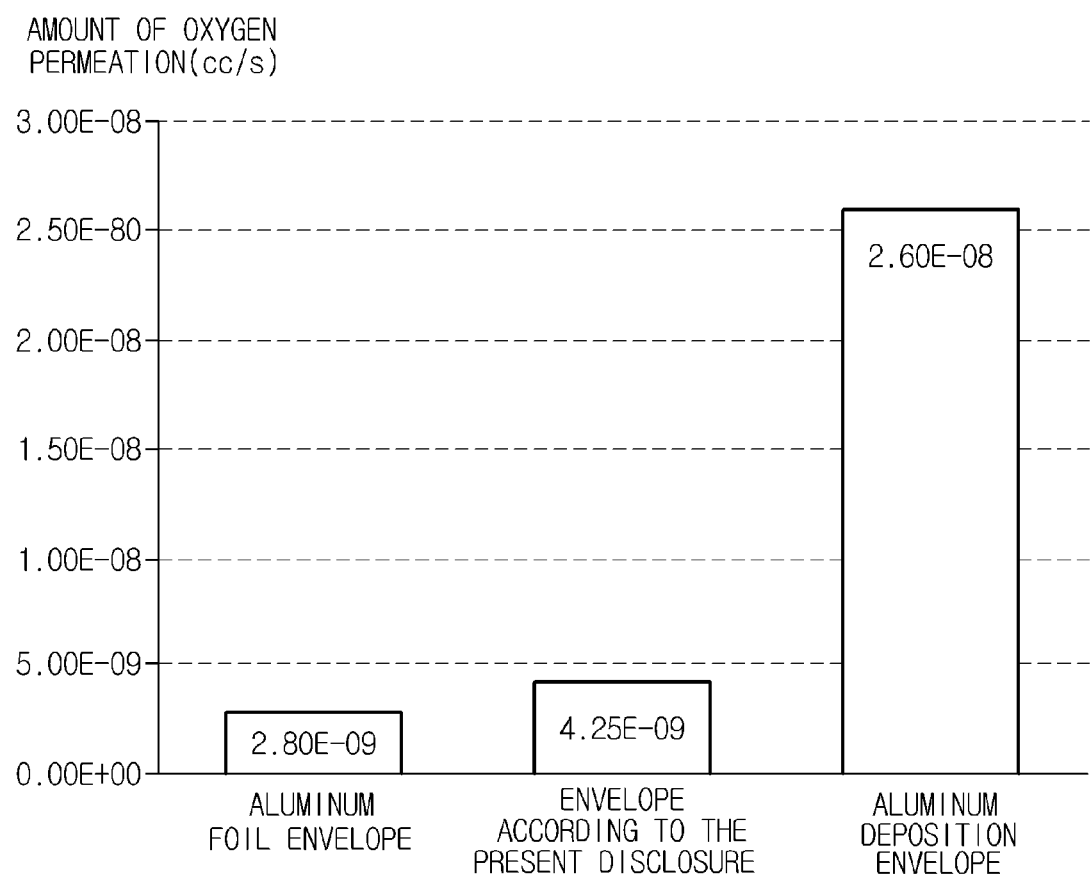
FIG. 5 is an experimental data showing the difference in oxygen (gas) permeation between the conventional vacuum heat insulating material and the vacuum heat insulating material in accordance with an embodiment.

FIG. 4 is a drawing illustrating the amount of gas Q passing through the vacuum insulating material in accordance with an embodiment, and FIG. 5 is an experimental data showing the difference in oxygen (gas) permeation between the conventional vacuum heat insulating material and the vacuum heat insulating material in accordance with an embodiment.

Referring to FIG. 4, $Q_1$ represents the amount of gas passing through the sealing layer 90, and $Q_2$ represents the amount of gas passing through the protective layer 10, the second blocking layer 20, the inner layer 40, and the sealing layer 90 in a direction getting close to the core material. $Q_3$ represents the amount of gas passing through the protective layer 10, the first blocking layer 30, the inner layer 40, and the sealing layer 90 in a direction getting close to the core material.

Hereinafter, the amount of gas $Q_1$ passing through an envelope 50c of a vacuum heat insulating material 100c in accordance with the embodiment will be compared with the amount of gas Q passing through an aluminum foil envelope and an aluminum deposition envelope in accordance with the conventional technology.

As shown in FIG. 4, the amount of gas $Q_1$ passing through the sealing layer 90 does not show a difference from the amount of gas passing through a sealing layer of the conventional aluminum foil envelope or a sealing layer of the conventional aluminum deposition envelope.

The amount of gas $Q_1$ passing through the sealing layer 90 of the vacuum heat insulating material 100c having a size of Wcm*Lcm*Hcm is expressed in equation 1 below.

$$Q_1 = -K_{Sealing} \times \{(2W+2L) \times 2t_{Sealing}\} \times \frac{\Delta P}{\delta_{Sealing}} \quad (1)$$

Here, $K_{sealing}$ represents gas permeation of the sealing layer 90, $t_{Sealing}$ represents the thickness of the sealing layer 90, $\delta_{Sealing}$ represents the length of welding, and $\Delta P$ represents the difference in pressure between inside and outside of the vacuum heat insulating material 100c.

The amount of gas $Q_3$ passing through an upper part and a lower part of the vacuum heat insulating material 100c is expressed in equation 2 below.

$$Q_3 = -K_3 \times (2WL) \times \frac{\Delta P}{\delta_3} \quad (2)$$

Here, $K_3$ and $\delta_3$ represent the permeation of gas passing through an upper and lower part envelope 50a, and the thickness of the upper and the lower part envelope 50a, respectively. When assumed that the blocking layer 30a and the conventional aluminum foil envelope do not have gas permeation, $K_3$ is equal to 0.

The amount of gas $Q_2$ passing through a side part envelope 50b of the vacuum heat insulating material 100c is expressed in equation 3 below.

$$Q_2 = -K_2 \times \{(2W + 2L) \times H\} \times \frac{\Delta P}{\delta_2} \quad (3)$$

Here, $K_2$ and $\delta_{32}$ represent the permeation of gas passing through the side part envelope 50b, and the thickness of the side part envelope 50b, respectively.

The total amount of gas permeation Q through the envelope 50c corresponds to the sum of amounts of gas permeation through the sealing layer 90, the upper and lower part envelope 50a and the side part envelope 50b, and when all physical properties of the conventional envelope that are generally used are applied to the vacuum heat insulating material 100c having a size of 30 cm*30 cm*1 cm, the amounts of gas permeation of the conventional aluminum foil envelope and the conventional aluminum deposition envelope are compared with the amount of gas permeation Q of the envelope 50c in accordance with the embodiment.

FIG. 5 is an experimental data showing the difference in oxygen (gas) permeation between the conventional vacuum heat insulating material and the vacuum heat insulating material in accordance with an embodiment.

Referring to FIG. 5, the aluminum deposition envelope has an oxygen (gas) permeability that is 9.3 times higher than that of the aluminum foil envelope having a superior durability. Meanwhile, the envelope 50c in accordance with the embodiment has an oxygen (gas) permeability that is 1.9 times higher than that of the aluminum foil envelope.

Figure 6:
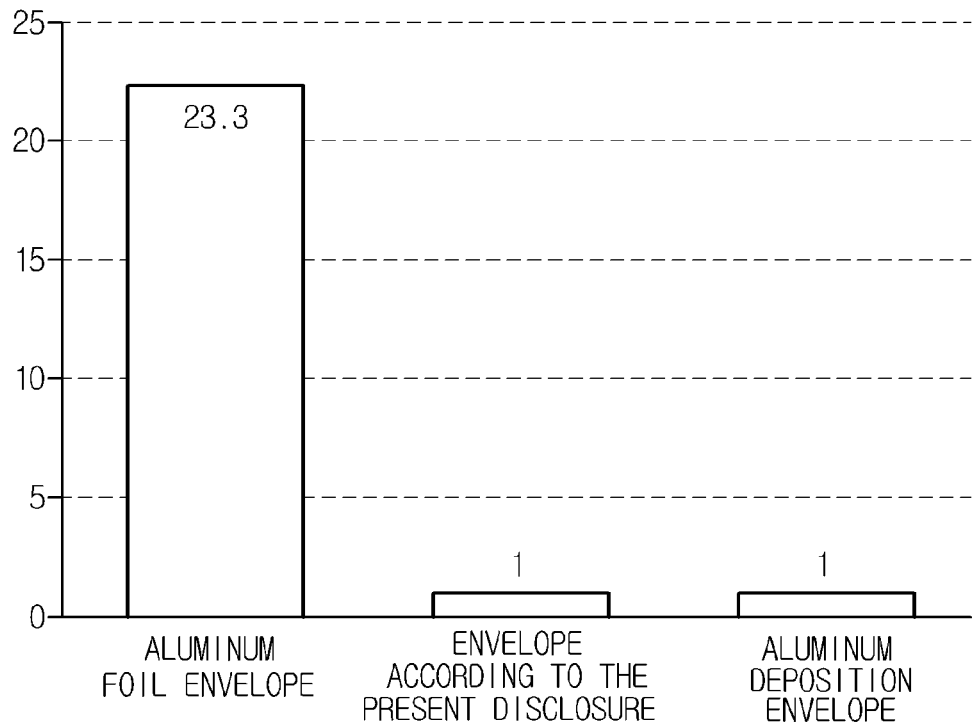
FIG. 6 is an experimental data showing the difference in thermal conductivity due to the heat bridge between the conventional vacuum heat insulating material and the vacuum heat insulating material in accordance with an embodiment.

FIG. 6 is an experimental data showing the difference in thermal conductivity due to the heat bridge between the conventional vacuum heat insulating material and the vacuum heat insulating material in accordance with an embodiment.

Referring to FIG. 6, the initial heat insulating performance due to the heat bridge phenomenon is evaluated as follows. The thermal conductivity of the vacuum heat insulating material due to the heat bridge is proportional to the thickness and the thermal conductivity of the blocking layer of the envelope, for example, the second blocking layer 20a in the present disclosure. The precise value of the thermal conductivity may differently provided depending on the configuration and the thickness of the blocking layer of the envelope, for example, the second blocking layer 20a in the embodiment, and depending on the way of folding the vacuum heat insulating material.

$$k_{H.B} \propto k_{barrier} \times t_{barrier} \quad (4)$$

Here, $k_{H.B}$ represents the thermal conductivity due to the heat bridge, and $k_{barrier}$ represents the thermal conductivity of the blocking layer, for example, the second blocking layer 20a in the present disclosure, and $t_{barrier}$ represents the thickness of the blocking layer, for example, the second blocking layer 20a in the present disclosure. When all physical properties of the conventional envelope that are generally used are applied to the vacuum heat insulating material 100c having a size of 30 cm*30 cm*1 cm, the thermal conductivities due to heat bride phenomenon of the conventional aluminum foil envelope, the conventional aluminum deposition envelope and the envelope 50c of the vacuum heat insulating material 100c in accordance with the embodiment are compared with one another.

Considering that the heat bridge phenomenon represents transfer of heat through a blocking layer of an edge portion of a vacuum heat insulating layer, the envelope 50b of the vacuum heat insulating material 100c in accordance with the present disclosure has the same heat bridge phenomenon as the conventional aluminum deposition envelope material. Meanwhile, the conventional aluminum foil envelope has a thermal conductivity 23.3 times higher than that of the envelope 50b in accordance with the embodiment, and thus has a poor heat insulating performance in the initial stage. The use of the envelope 50b according to the embodiment may effectively prevent the heat bridge phenomenon.

Figure 7:
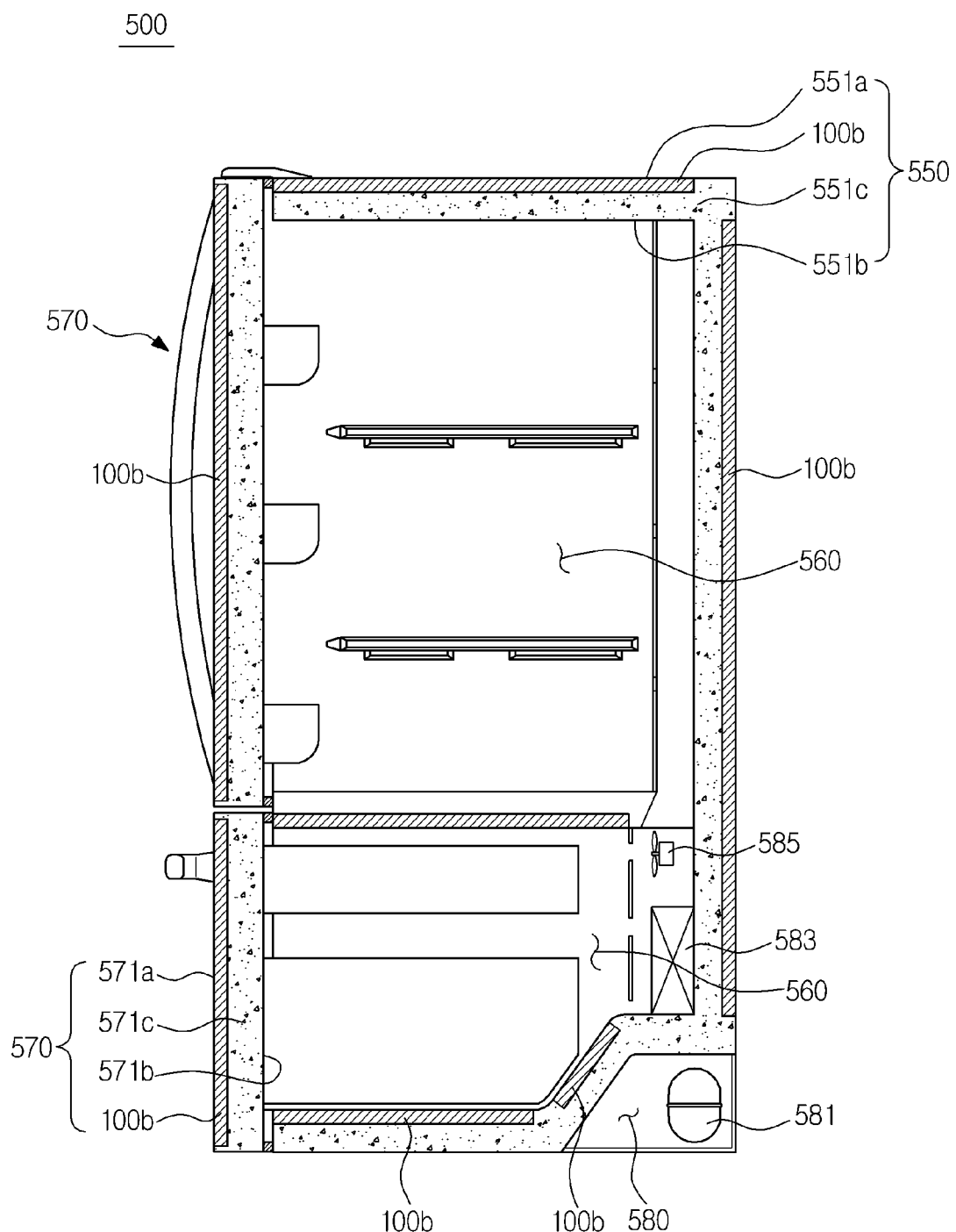
FIG. 7 is a drawing illustrating a refrigerator to which the vacuum heat insulating material in accordance with an embodiment is applied.

FIG. 7 is a drawing illustrating a refrigerator to which the vacuum heat insulating material in accordance with an embodiment is applied.

Referring to FIG. 7, a refrigerator 500 provided with a vacuum heat insulating material 100b in accordance with the present disclosure includes a refrigerator body 550 forming a cooling compartment 560 therein, a door 570 to open and close the cooling compartment 560, and the vacuum heat insulating material 100b provided on the refrigerator body 550 or the door 570. Here, the cooling compartment 560 may collectively refer to a freezing compartment and a refrigerating compartment, and the refrigerator body 550 may be provided with only one of the freezing compartment and the refrigerating compartment.

The vacuum heat insulating material 100b is shown in an enlarged view as in FIG. 1.

The vacuum heat insulating material 100b may include a core material 60, a sealing layer 90, an inner layer 40, a protective layer 10, a first blocking layer 30 and a second blocking layer 20.

The vacuum heat insulating material 100b may include the core material 60, the sealing layer 90 surrounding the core material 60, the inner layer 40 covering the sealing layer 90 and having a first side 41 and a second side 42 connected to the first side 41, a protective layer 10 located at an outside of the inner layer 40 to reduce shock, a first blocking layer 30 having at least one portion thereof located between the first side 41 of the inner layer 40 and the protective layer 10, and a second blocking layer 20 having at least one portion located between the second side 42 of the inner layer 40 and the protective layer 10.

The vacuum heat insulating material 100b accommodated in the refrigerator 500 includes an extension part 70 protruding in a direction getting distant from the core material 60 and having a structure including the sealing layer 90, the inner layer 40, the second blocking layer 20 and the protective layer 10 stacked up against one another.

One of the first blocking layer 3 and the second blocking layer 20 may be bent.

The first blocking layer 30 is provided in parallel to the first side 41 of the inner layer 40, and the second blocking layer 20 is provided at the second side 42 while connecting to the first blocking layer 30.

The refrigerator body 550 includes an outer case 551a forming the external appearance thereof, and an inner case 551b spaced apart from the inner side of the outer case 551a so as to form a space for a heat insulating layer 551c while forming the cooling compartment 560 therein. The refrigerator body 550 is provided with a cooling cycle to provide the cooling compartment 560 with cool air. A machine room 580 may be formed at a lower portion of a rear side of the refrigerator body 550. Some components of the cooling cycle including a compressor 581 and a condenser may be installed inside the machine room 580. An evaporator 583 may be provided at one side of inside the cooling compartment 560. A cooling fan 585 may be provided at one side of the evaporator 583.

The vacuum heat insulating material 100b may be provided on at least one side surface of the refrigerator body 550. Accordingly, the side surface is provided in a reduced thickness, and thus the interior storage space is enlarged while maintaining the same external appearance.

The door 570 includes a door outer case 571a forming the external appearance thereof, and a door inner case 571b spaced apart from the inner side of the door outer case 571a so as to form a space for a heat insulating layer 571c.

The door 570 is provided with the vacuum heat insulating material 100b. The vacuum heat insulating material 100b is provided between the door outer case 571a and the door inner case 571b, so that the thickness of the door 570 is reduced.

In addition, the vacuum heat insulating material 100a is provided such that the envelope 50 is supported by the core material 60, thereby preventing the surface of the envelope 50 from being wrinkled. Accordingly, attachment failure that may be caused by wrinkles generated when the vacuum heat insulating material 100b is attached to an object is restrained.

In detail, when the refrigerator body 550 is manufactured, the vacuum heat insulating material 100b is disposed between the outer case 551a and the inner case 551b before a foaming process, and fixed to one of the outer case 551a and the inner case 551b. After the vacuum heat insulating material 100b is fixed, a form liquid (polyurethane) is injected in between the outer case 551a and the inner case 551b.

The form liquid injected between the outer case 551a and the inner case 551b is expanded while flowing in the inner space between the outer case 551a and the inner case 551b. At this time, almost no wrinkles are present on the surface of the envelope 50 of the vacuum heat insulating material 100b, so that the vacuum heat insulating material 100b completely comes into close contact with the surface of the outer case 551a or the inner case 551b. Accordingly, the foam liquid is prevented from being introduced in between the vacuum heat insulating material 100b and the outer case 551a or in between the vacuum heat insulating material 100b and the inner case 551b, thereby restraining the attachment failure in which the vacuum heat insulating material 100b is separated from the outer case 551a or the inner case 551b.

A refrigerator as shown above is used as a example means only for application of the embodiment. It would be appreciated by one skilled in the art that embodiment can be applied to any home appliance that requires insulation, for example, freezer, dishwasher, washing machine, dryer, etc. Furthermore, one skilled in the art would appreciate that the embodiment can be applied to any apparatus that requires insulation.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A vacuum heat insulating material comprising:
a core material in a vacuum state;
a sealing layer surrounding the core material;
an inner layer covering the sealing layer, and having a first side and a second side connected to the first side;
a protective layer located at an outside of the inner layer;
a laminated first blocking layer having at least one portion laminated between the first side of the inner layer and the protective layer; and
a deposited second blocking layer, being a separate layer from the laminated first blocking layer, having at least one portion deposited between the second side of the inner layer and the protective layer.

2. The vacuum heat insulating material of claim 1, wherein an entire area of a side of the laminated first blocking layer makes contact with the first side of the inner layer, and an entire area of a side of the deposited second blocking layer makes contact with the second side of the inner layer.

3. The vacuum heat insulating material of claim 1, wherein at least one portion of the laminated first blocking layer makes contact with the first side of the inner layer, and an entire area of a side of the deposited second blocking layer makes contact with the second side of the inner layer while connecting to the laminated first blocking layer.

4. The vacuum heat insulating material of claim 1, wherein an entire area of a side of the laminated first blocking layer makes contact with the first side of the inner layer, and at least one portion of the deposited second blocking layer makes contact with the second side of the inner layer while connecting to the laminated first blocking layer.

5. The vacuum heat insulating material of claim 1, wherein at least one portion of the laminated first blocking layer makes contact with the first side of the inner layer, and at least one portion of the deposited second blocking layer makes contact with the second side of the inner layer while overlapping with the laminated first blocking layer.

6. The vacuum heat insulating material of claim 1, wherein material comprising the laminated first blocking layer includes aluminum (Al) and stainless steel, and has a thickness of about 5 µm or above to about 30 µm or below.

7. The vacuum heat insulating material of claim 1, wherein material comprising the deposited second blocking layer includes at least one of metal, inorganic matter and organic matter.

8. The vacuum heat insulating material of clam 7, wherein the metal includes at least one of aluminum and stainless steel.

9. The vacuum heat insulating material of claim 7, wherein the inorganic matter includes at least one of silicon dioxide ($SiO_2$), aluminum oxide ($Al_2O_3$), titanium dioxide ($TiO_2$), and polysilazane.

10. The vacuum heat insulating material of claim 7, wherein the organic matter includes at least one of silane and fluorine resin.

11. The vacuum heat insulating material of claim 1, wherein the deposited second blocking layer is formed using a method involving at least one of physical deposition, chemical deposition and wet coating.

12. The vacuum heat insulating material of claim 1, wherein the deposited second blocking layer has a thickness of about 20 nm or above to about 30 µm or below.

13. The vacuum heat insulating material of claim 1, wherein the protective layer includes at least one of polyester (PET), oriented polypropylene (OPP), nylon, and oriented nylon.

14. The vacuum heat insulating material of claim 1, wherein the inner layer includes at least one of polyester (PET), vacuum materialized polyester (VM-PET), ethylene-vinyl alcohol (EVOH), and nylon.

15. The vacuum heat insulating material of claim 1, wherein the vacuum heat insulating material further comprises an extension part having a structure including the inner layer, the deposited second blocking layer and the protective layer stacked up against one another from the sealing layer that protrudes in a direction getting distant from the core material.

16. A refrigerator comprising:

an outer case;

an inner case provided inside the outer case to accommodate a storage chamber; and a heat insulating layer located between the outer case and the inner case, wherein the heat insulating layer includes polyurethane foam and a vacuum heat insulating material, the vacuum heat insulting material comprising:

a core material in a vacuum state;

a sealing layer surrounding the core material an inner layer covering the sealing layer, and having a first side and a second side connected to the first side;

a protective layer located at an outside of the inner layer so as to reduce shock;

a laminated first blocking layer having at least one portion laminated between the first side of the inner layer and the protective layer; and a deposited second blocking layer, being a separate layer from the laminated first blocking layer, having at least one portion deposited between the second side of the inner layer and the protective layer so as to reduce a heat bridge phenomenon.

17. The refrigerator of claim 16, wherein the vacuum heat insulating includes an extension part having a structure including the sealing layer, the inner layer, the deposited second blocking layer and the protective layer that are stacked up against another in a direction getting distant from the core material.

18. The refrigerator of claim 16, wherein at least one of the first laminated blocking layer and the deposited second blocking layer is bent.

19. The refrigerator of claim 16, wherein the laminated first blocking layer is provided in parallel to the first side of the inner layer, and the deposited second blocking layer is provided at the second side of the inner layer while connecting to the laminated first blocking layer.

20. The refrigerator of claim 16, wherein the vacuum heat insulating material is provided with the protective layer having a thickness of about 10 μm or above to about 30 μm or below, and the inner layer having a thickness of about 5 μm or above to about 30 μm or below.

21. The refrigerator of claim 16, wherein the vacuum heat insulating material is provided with the deposited second blocking layer including a complex layer having an inorganic matter and an organic matter, the inorganic matter including at least one of silicon dioxide ($SiO_2$), aluminum oxide ($Al_2O_3$), titanium dioxide ($TiO_2$) and polysilazane, the organic matter including at least one of silane and fluorine resin.

22. A home appliance comprising:

a body;

a vacuum heat insulting material located on the surface of the body, wherein the vacuum heating insulating material comprises:

a core material in a vacuum state;

a sealing layer surrounding the core material an inner layer covering the sealing layer, and having a first side and a second side connected to the first side;

a protective layer located at an outside of the inner layer so as to reduce shock;

a laminated first blocking layer having at least one portion laminated between the first side of the inner layer and the protective layer; and a deposited second blocking layer, being a separate layer from the laminated first blocking layer, having at least one portion deposited between the second side of the inner layer and the protective layer so as to reduce a heat bridge phenomenon.

* * * * *